US012711427B1

(12) United States Patent
Pardo

(10) Patent No.: US 12,711,427 B1
(45) Date of Patent: Aug. 18, 2026

(54) SYSTEMS AND METHODS FOR PERSONALIZED MULTI-USER INTERACTIONS IN AI COMMUNICATION

(71) Applicant: Fortix Inc., Maple (CA)

(72) Inventor: Rene Pardo, Maple (CA)

(73) Assignee: FORTIX INC., Vaughan (CA)

( * ) Notice: Subject to any disclaimer, the term of this patent is extended or adjusted under 35 U.S.C. 154(b) by 0 days.

(21) Appl. No.: 19/084,218

(22) Filed: Mar. 19, 2025

(51) Int. Cl.
*G06N 20/00* (2019.01)
*G06F 21/55* (2013.01)
*G06F 21/62* (2013.01)
*G06F 40/30* (2020.01)

(52) U.S. Cl.
CPC ........... *G06N 20/00* (2019.01); *G06F 21/554* (2013.01); *G06F 21/629* (2013.01); *G06F 40/30* (2020.01)

(58) Field of Classification Search
CPC ....... G06N 20/00; G06F 40/30; G06F 21/554; G06F 21/629
See application file for complete search history.

(56) References Cited

U.S. PATENT DOCUMENTS

| | | | | |
|---|---|---|---|---|
| 8,839,275 | B1 * | 9/2014 | Bolt .................... | G06F 12/0804 719/321 |
| 11,430,439 | B2 | 8/2022 | Shreeshreemal | |
| 12,373,897 | B1 * | 7/2025 | Tran ...................... | G06F 40/295 |
| 2011/0106736 | A1 | 5/2011 | Aharonson | |
| 2012/0011140 | A1 * | 1/2012 | Chakra ................ | G06Q 10/107 709/224 |
| 2016/0212185 | A1 * | 7/2016 | Krishnan .............. | H04L 65/403 |
| 2019/0200409 | A1 * | 6/2019 | Chiang ................. | H04W 76/11 |

(Continued)

FOREIGN PATENT DOCUMENTS

| | | | | |
|---|---|---|---|---|
| EP | 3817329 A1 * | 5/2021 | .......... | H04L 65/1104 |
| IN | 202121003212 A * | 7/2022 | ............... | A61B 5/11 |
| WO | WO-2023163960 A1 * | 8/2023 | | |

OTHER PUBLICATIONS

Manos, Anastasios, Despina Elisabeth Filippidou, Nikolaos Pavlidis, Georgios Karanasios, Georgios Vachtanidis, Arianna D'Ulizia, and Alessia D'Andrea. "Knowledge Graphs and Machine Learning in Fake News and Disinformation Detection." In 2024 International Conference on Engineering . . . (ICEET), pp. 1-6. (Year: 2024).*

*Primary Examiner* — Casey R. Garner
(74) *Attorney, Agent, or Firm* — Smart & Biggar LP

(57) ABSTRACT

Systems and methods for managing AI memory recall, validation, and secure access are disclosed. The invention enables AI to dynamically retrieve and verify stored memory across multiple user interactions while ensuring security and privacy compliance. A hierarchical memory access model restricts unauthorized recall based on user authentication levels, while a trust-weighted retrieval system adjusts memory recall permissions in real time based on evolving user trust scores. AI-driven validation mechanisms ensure that only relevant and accurate stored information is retrieved, cross-checking external validation sources when necessary. Additionally, AI communication-based memory retrieval enables multi-device interaction and adaptive recall filtering based on user preferences and device type. The disclosed system enhances AI conversational integrity, secures memory recall processes, and provides structured access control mechanisms to prevent unauthorized data exposure.

20 Claims, 7 Drawing Sheets

(56) References Cited

U.S. PATENT DOCUMENTS

| | | | | |
|---|---|---|---|---|
| 2022/0083538 | A1* | 3/2022 | Negulescu | G06F 21/604 |
| 2024/0256592 | A1* | 8/2024 | O'Neill | G06V 30/10 |
| 2024/0412720 | A1* | 12/2024 | Vasylyev | G06F 16/90332 |
| 2024/0414108 | A1* | 12/2024 | Sun | H04L 51/216 |
| 2025/0139375 | A1* | 5/2025 | Bright | G06F 40/35 |

* cited by examiner

SYSTEMS AND METHODS FOR PERSONALIZED MULTI-USER INTERACTIONS IN AI COMMUNICATION

TECHNICAL FIELD

Example embodiments relate to interactions between users in communication with artificial intelligence (AI) systems.

BACKGROUND

In artificial intelligence (AI) communication platforms, maintaining personalized and context-aware interactions can significantly enhance the user experience. Current AI systems often lack the capability to personalize interactions based on multi-user relationships or on past conversations. Although many systems can recall past interactions within the same conversation, once the user exits the conversation the AI system may no longer be able to reference or recall the interactions. Further, AI systems cannot generally recall information or interactions with other users while interacting with a different user. This lack of recall may be based on privacy policies or settings which cannot be altered by users or may be based on attempting to save computational resources. This can lead to communication loss between users of a system, or inefficiencies in AI based interactions, as information is not carried from one interaction to another. In specific scenarios where AI systems may be able to recall information, allowing the system to generally recall and output all information may lead to security issues if unauthorized users are able to gain access to sensitive information during a conversation with an AI.

There is thus a need in the art for a modified AI system which can remember specific user interactions, recognize relationships between users, and provide personalized responses accordingly. There is further a need in the art for the modified AI system to only recall and output information that a user is allowed to access, in order to prevent security threats or unwanted knowledge exposure. This modified AI system should build off of pre-existing generic generative AI systems, such as generic large language models (LLMs).

SUMMARY

An example embodiment is a system for artificial intelligence (AI) memory recall, comprising a generative artificial intelligence (GenAI) model with integrated memory recall functionality; and a memory storage mechanism configured to persist contextual data beyond a single interaction, wherein the system dynamically retrieves relevant contextual data and generates responses based on stored interactions across one or more sessions.

Another example embodiment is a system for secure artificial intelligence (AI) memory recall, comprising a hierarchical access control mechanism that restricts AI memory retrieval based on user authorization levels, wherein AI memory recall is dynamically adjusted based on access permissions, preventing unauthorized retrieval.

Another example embodiment is a system for artificial intelligence (AI)-driven contextual memory validation, comprising an AI memory module configured to store contextual data; and a validation module that verifies stored memory accuracy prior to retrieval, wherein the system restricts retrieval of unverified memory and ensures validated memory is used in AI responses.

Another example embodiment is a method for artificial intelligence (AI)-driven communication-based memory retrieval, comprising receiving, by a processor, one or more first manual inputs into a generative artificial intelligence (GenAI) system; analyzing, by the GenAI system, the one or more first manual inputs to determine if the input contains relevant information; receiving one or more second manual inputs into the GenAI system; determining, based on the one or more second manual inputs, whether to output the relevant information; and based on a determination that the relevant information should be output, transmitting the relevant information to one or more communication devices.

BRIEF DESCRIPTION OF THE DRAWINGS

Reference will now be made, by way of example, to the accompanying drawings which show example embodiments of the present application, and in which.

DESCRIPTION OF EXAMPLE EMBODIMENTS

Figure 1:
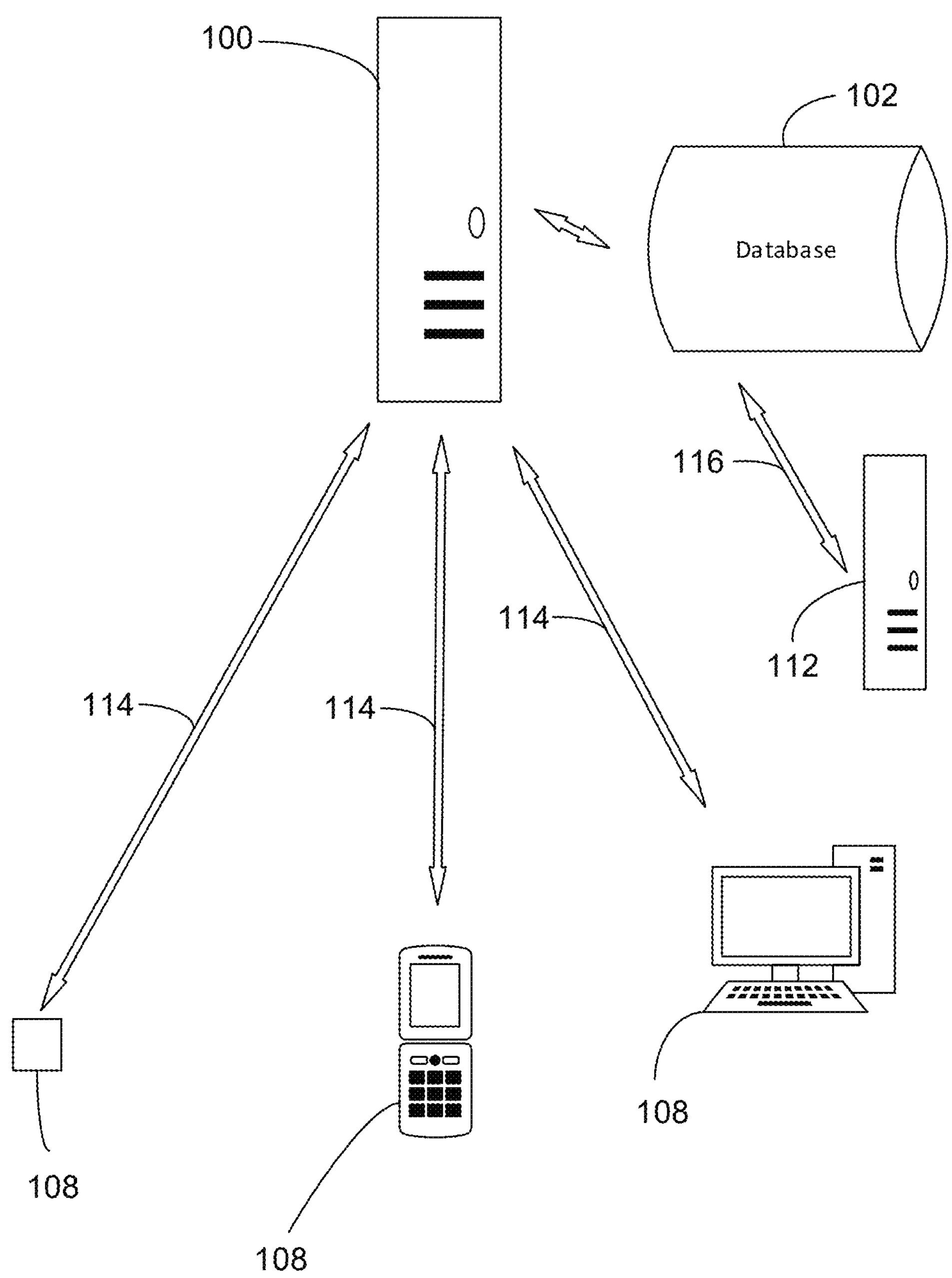
FIG. 1 is a schematic diagram of a modified generic generative AI LLM system, according to an example embodiment.

As used herein, a person skilled in the art refers to a practitioner with knowledge and experience in artificial intelligence, machine learning, and AI-based communication systems, including memory recall, contextual adaptation, and security frameworks. This definition includes individuals with expertise in developing and implementing AI-based systems capable of personalized interaction, hierarchical access control, and adaptive trust-based memory retrieval mechanisms FIG. 1 illustrates a system 10 for interaction with an Artificial Intelligence (AI) system, in accordance with an example embodiment. In an embodiment, the AI system is a generative AI system. In an embodiment, the AI system is a generic generative AI system. In an embodiment, the AI system is a modified generic generative AI system. In an embodiment, the modified generic generative AI system is a large language model (LLM). The system 10 may be for use by any number of users, with any number of electronic devices 108. Although interactions between two users are described herein, a person of skill in the art recognizes that any number of users can interface with the modified generic generative AI system, and through the modified generic generative AI system can interact with each other.

The system 10 can include an LLM server 100, an external database 102, and one or more electronic devices 108. The LLM server 100 may be a cloud platform, which can offer scalable resources that are required to process large amounts of data. Additionally, a cloud server allows the data stored in the database 102 as well as inputs and outputs of the LLM server 100 to be accessed and stored in various locations globally. Alternatively, the LLM server 100 may be a physical server hosted in a physical location.

In an embodiment, the LLM server 100 interacts with the database 102 in order to create personalized environment for a user, whereby a user's preferences, interaction history, and profile are stored in the database 102. The profile of the user may be a registered profile, such as an account, where the user can create a personalized account with all of their information. The registered profile may belong to any entity, such as an individual, a corporation, a business, or an organization. In an embodiment, the profile of the user may be an unregistered profile, whereby the user does not create an account, but certain identifying information about the user is stored in the database 102 to differentiate them from other users. In an embodiment, the database 102 can receive information directly from a remote server 112, for example, from information available on the internet. The database 102 can communicate with the remove server 112 through various means, such as via a communication link 116, to receive any information necessary.

As will be discussed in greater detail in FIG. 3, the LLM server 100 is configured to receive input from users through the electronic devices 108. In an embodiment, the input from the user may be a question, command, or instruction. The LLM server 100 is also configured to output responses to the user's question, command, or instruction, via the electronic devices 108. The electronic device 108 can include a microphone for receiving voice inputs from a user and a speaker for communicating the outputs of the LLM server 100. The electronic device 108 may also include a screen or touchscreen for interaction with a user interface. The electronic device 108 may also include a keyboard for receiving text inputs from a user and a display screen for communicating the outputs of the LLM server 100. The electronic device 108 can be a desktop, a laptop, or a mobile communication device, such as a smart phone or a tablet. The electronic device 108 can be a stationary IoT device having a microphone and a speaker, such as a smart speaker. The electronic devices 108 can be connected to the LLM server 100 via a communication link 114. With the electronic device 108, the system 10 is suitable for use by any number of users at a time.

Figure 2:
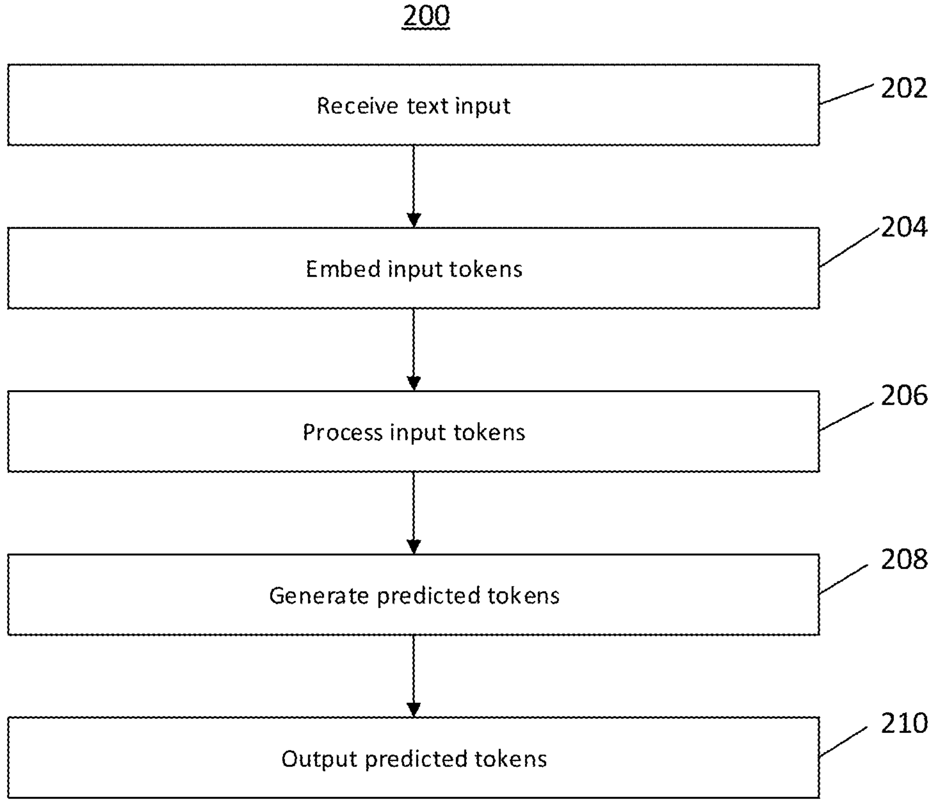
FIG. 2 is a flowchart illustrating an example method for processing text input and generating text output using the modified generic generative AI LLM system of FIG. 1.

FIG. 2 is a flow chart illustrating a general method 200 through which the modified generic generative AI LLM system processes user inputs and creates user outputs. The modified generic generative AI system may use a generic generative AI system, such as ChatGPT GPT-4, DALL-E, Google Gemini, Microsoft CoPilot, or any other generic generative AI system that is trained on a large, unspecific data set. The generic generative AI system may be modified to have an internal database to store information, or may be modified to access external databases.

In method 200, at step 202 the LLM server 100 receives user input in the form of text input. The user may provide this input via electronic device 108. Prior to receiving the user input, the LLM may be trained using supervised or unsupervised learning on large amounts of text data. During training, the LLM may use backpropagation and gradient descent to adjust internal weights to reduce prediction error. A training objective may be framed as:

$$P(w_1, w_2, \ldots, W_T) = \prod_{t=1}^{T} P(w_t \mid w_1, \ldots, w_{t-1})$$

where $w_t$ is the word at time step t, and the model attempts to predict $w_t$ based on all of the previous words. The LLM may receive user input by any method or electronic device 108 as discussed previously. Once the LLM has received the user text input, each word, subword, or character may be broken into tokens which can be more efficiently processed by the model.

At step 204, the LLM converts the input tokens into embeddings. Each token is mapped to a vector in a high-dimensional space. The embeddings are learned during the training process of the LLM, and may represent the semantic meaning of each token, including various aspects of meanings, such as synonyms and relationships between words. Positional encoding may also be added to the token embeddings to provide information relating to the position of each input token in the sequence. These positional encodings may be learned encodings or fixed encodings.

At step 206, the input tokens are processed by the LLM. The processing may be done by means of a transformer architecture. The transformer architecture may consist of an encoder and a decoder. The encoder works to process the input sequence by capturing relationships between words in the input. This may be done with or without regard to the position of the words in the sequence. By way of a self-attention mechanism, each input token is processed in parallel, and the self-attention mechanism allows the LLM to focus on each different token in an input sequence, and how it relates to other words in the input sequence. The model may calculate a self-attention score for each token through the equation:

$$\text{Attention}(Q, K, V) = softmax\left(\frac{QK^T}{\sqrt{d_k}}\right)V$$

where Q represents the query matrix, K represents the key matric, V represents the value matrix, and $d_k$ is the dimension of the key vectors. The outcome of this equation is a weighted sum of values for each token.

After the self-attention step, the representation of each token is passed through a neural network to further process the information. In an embodiment, this may be a feed-forward neural network. The encoder may be composed of multiple layers of self-attention and feed-forward neural networks, allowing the model to process increasingly complex relationships between words in the input sequence.

At this stage, the modified generic generative AI system may communicate with database 102 to gain additional information related to previous conversations or stored user profiles in order to contextualize the user input. For example, a user may have previously defined a common word to have a different meaning than typically known, or may have assigned a meaning to a new or created word. A generic generative AI system would not have the relevant context to process this type of information properly, unless the information was given within the same communication session. However, the modified generic generative AI system may have access to a user profile or a previous conversation, and can therefore draw on the stored information to understand the full scope of context for a word.

In another example, as will be discussed further, the database 102 may further provide the modified generic generative AI system information about multiple user profiles that are known by the modified generic generative AI system. In an embodiment, this information may provide the model with context for user instructions, particularly instructions that affect other users.

At step 208, the decoder generates the output sequence, such as a sentence or response. Based on the encoded representations from the encoder, the decoder generates an output sequence on a token-by-token basis. Each generated token depends on both the context captured by the encoder, as well as the previous tokens. The decoder may utilize a masked self-attention mechanism, which ensures that the LLM does not look ahead to future tokens while generating the current token. The decoder may also include an additional attention layer which allows the LLM to focus on relevant sections of the input when generating each output token.

At step 210, the decoder outputs the predicted tokens to the user, to any electronic device as discussed previously. The decoder may output text with or without formatting, including letters, numbers, or symbols. The resulting output text may be the answer to a question asked by the user, a confirmation of an instruction, a question, or any other type of sentence or text understandable by the user.

Figure 3:
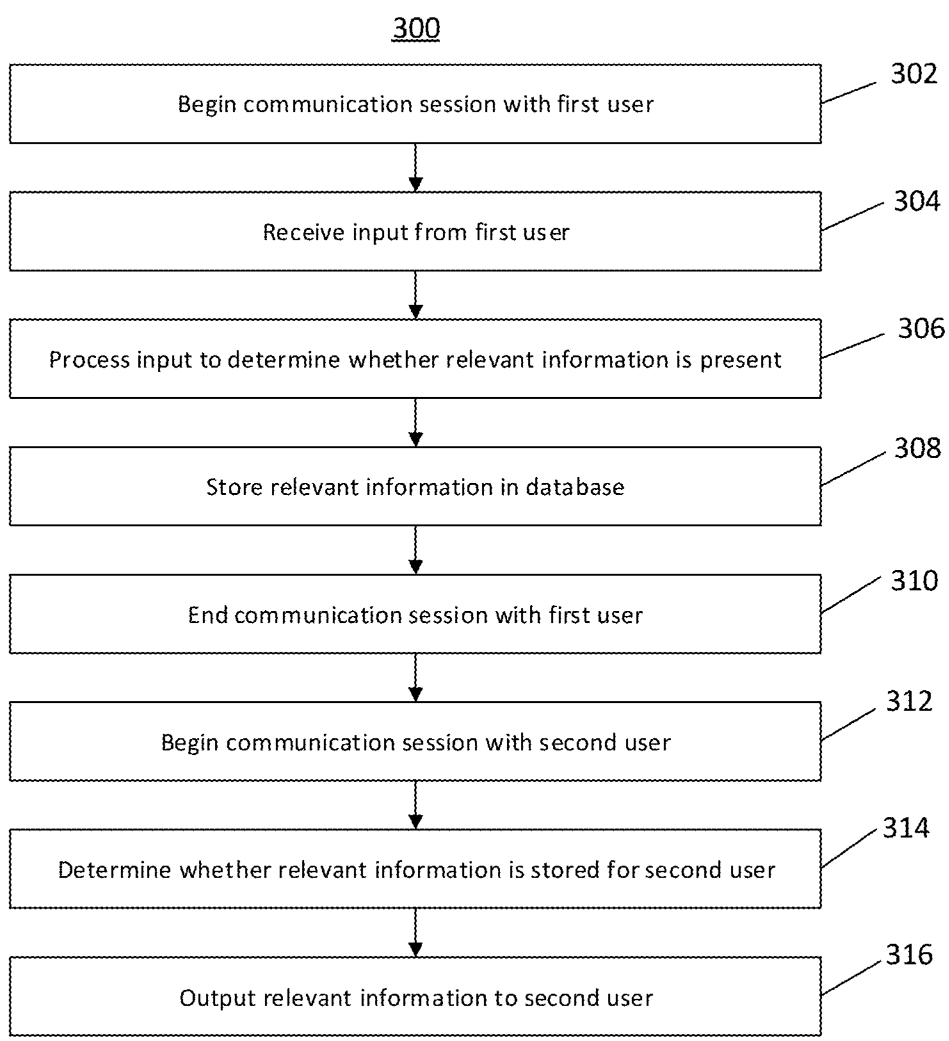
FIG. 3 is a flowchart illustrating an example method for multi-user interactions with the modified generic generative AI LLM system of FIG. 1.

Looking now at FIG. 3, a flowchart illustrating an example series of interactions between the LLM and multiple users is described.

At step 302, the LLM begins a communication session with a first user. This may be a new user (i.e., not previously known to the LLM), or it may be a returning user (i.e., previously known to the LLM). As described previously, information about the user and previous interactions may be stored in a registered profile, such as a user account, or in an unregistered profile, using other identifying information to determine whether the user has interacted with the LLM previously.

At step 304, the LLM receives input from the user. The input may be received by the user by any method previously described, such as through electronic device 108.

At step 306, the input is processed via the methods described above in FIG. 2. When processing the input, the LLM will further determine if any relevant information is present in the input from the first user. In an embodiment, the relevant information may comprise any information that requires the LLM to update the database 102. In an embodiment, the relevant information may be an instruction to alter information in the current user's profile. For example, the instruction may be: "change my birthday to Apr. 1, 2000". In an embodiment, the relevant information may be an instruction to alter information in another user's profile. For example, the instruction may be "Change Cameron's birthday to Apr. 1, 2000". In an embodiment, altering information in another user's profile may require verification by the user whose information is being changed. In an embodiment, the relevant information may be an instruction to output a specific string of text to another user during a subsequent interaction with that user. For example, the instruction may be: "Tell Cameron that I said hello!". In an embodiment, the relevant information may be an instruction to output a specific string of text to the current user during a subsequent interaction with the current user. For example, the instruction may be: "Remind me next time we talk to update my grocery list".

As will be appreciated from the above, the user does not necessarily need to provide all relevant context for each instruction, as the LLM can use information in the database 102 to inform the analysis of the input text. For example, in the instruction: "Remind me next time we talk to update my grocery list", the user does not have to provide an explicit user profile for which the instruction relates, nor do they have to provide context of what may be present in their grocery list. In an embodiment, the LLM may determine that relevant information is present, even when the input is not an instruction related to a command. For example, the current user may, in conversation with the LLM, mention information about another user that is not currently stored in database 102 or conflicts with current information stored in database 102. Although the current user does not explicitly instruct the LLM to update information in the database, the LLM may nonetheless recognize that relevant information has been received and update database 102 accordingly.

Figure 6:
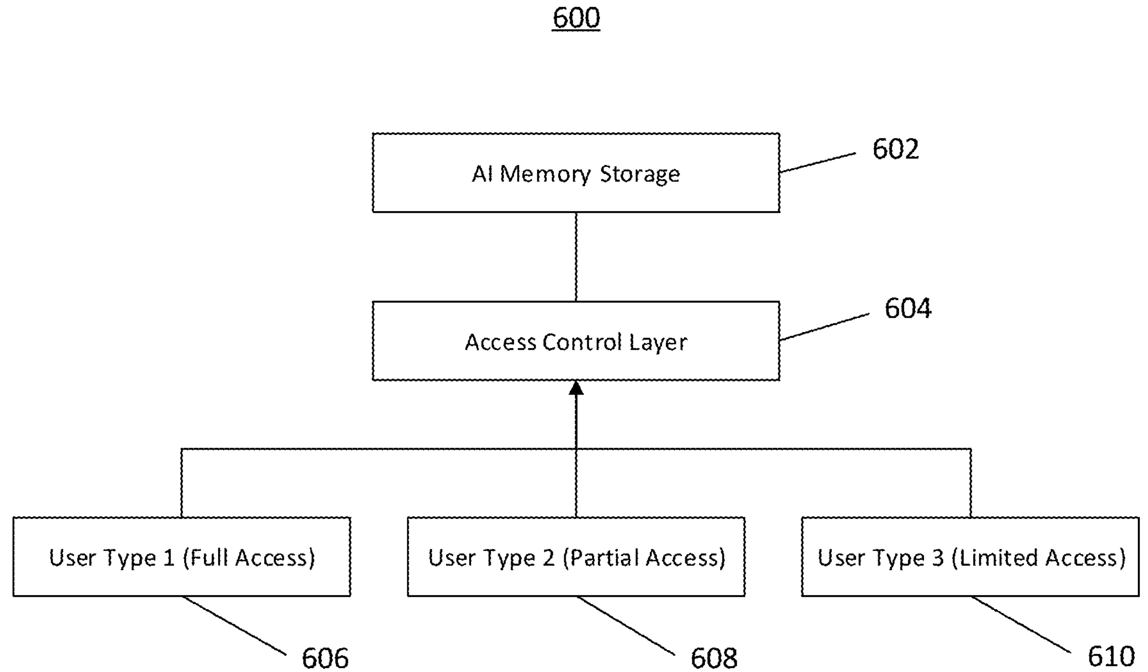
FIG. 6 is an exemplary hierarchical memory access control model.
Figure 7:
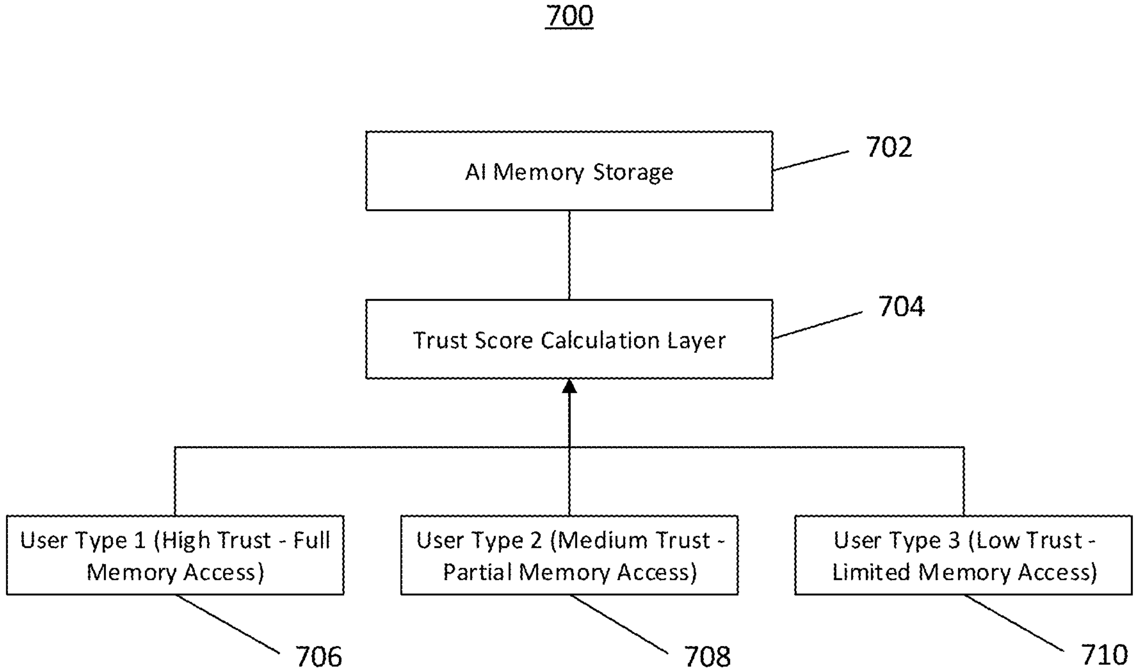
FIG. 7 is an exemplary trust-weighted AI memory retrieval system.

At step 308, the LLM stores the relevant information received during the communication session in the database 102. In an embodiment, the user may specify access control levels related to the relevant information (such as public, restricted, etc.), as is illustrated in FIGS. 6 and 7. As discussed previously, generic generative AI systems do not have internal databases, nor do they interface with external databases. As a result, information about users or information about previous conversations is not stored, and is lost as soon as the user exits the communication session. This can be particularly disruptive where a communication session is ended abruptly in error, due to internet or technical issues. Therefore, the modified generic generative AI system streamlines the communication process, as users do not have to provide context for each input at the beginning of a communication session. Further, the modified system prevents information from being lost in the event of a disruption. To aid in categorization of information, the LLM may assign contextual tags to the relevant information, which can be used to simplify and expedite retrieval of information.

At step 310, the communication session with the first user ends, such as by the user terminating the communication session. In an embodiment, a conversation log of the entire communication session may be saved to database 102. In an embodiment, only the relevant information received during the communication session may be saved to database 102.

At step 312, a second, unrelated communication session is begun with a second user. This second communication session may take place on the same electronic device 108 as the first communication session, or on a separate electronic device 108 as the first communication session. As mentioned previously, the identity of the second user may be determined based on a registered account profile of the second user or based off of unregistered identifying data.

At step 314, the LLM determines whether any relevant information is currently being stored for the second user. In an embodiment, the LLM may use any contextual tags assigned at step 308 to find and retrieve the information. This relevant information may be stored on database 102. In an embodiment, there may be multiple sets of relevant information to be output to the second user. The relevant information from previous sessions may be deleted once it is output to the respective user, to save storage space in database 102. Therefore, the relevant information for the second user stored in database 102 may comprise only recent information that has been received since the last time relevant information was output to the second user. Additionally, the relevant information may be determined based on a user's access permissions, as illustrated in detail in FIGS. 6 and 7. The LLM may wait for user inputs to perform the determination of whether any relevant information is currently being stored, or may generate suggestions for the second user in real-time based on patterns of the second user's input.

At step 316, the LLM outputs the relevant information to the second user. Before outputting the information, the LLM may verify the accuracy, consistency, and relevance of the stored relevant information, as described in FIG. 5. In an embodiment, the relevant information is output based on the order it was received by other users, in a first-in-first-out system. In an embodiment, the relevant information is output in order based on a perceived level of importance of the information. For example, a message received from the first user instructing the second user to investigate a potential security breach may have a perceived higher level of importance than a message received from a third user offering a greeting to the second user. In an embodiment, once the relevant information has been output to the second user, the LLM may store information on database 102 to notify the first user that the relevant information has been output to the second user during the next communication session with the first user. In an embodiment, a history of outputs to a user may be tracked and documented for future reference. For example, if a user frequently receives outputs related to financial data that appears irrelevant to them, the usage patterns may be flagged for further review. In an embodiment, this tracking may be done to ensure compliance with data protection regulations, or for future compliance auditing.

As mentioned previously, the relevant information may include verification or approval about changes made by other users. In an embodiment, the LLM may output a question to the second user, asking whether they approve the change. In an embodiment, the identity of the user who requested the change may remain anonymous. In an embodiment, if the second user does not approve the chance, the LLM may store information on database 102 to notify the first user that the change was not approved during the next communication session with the first user.

Although the second communication session in FIG. 3 has been described as beginning after the first communication session has ended, a person of skill in the art would appreciate that the two separate communication sessions may take place concurrently on separate electronic devices 108. That is, if a first user and a second user are interacting with the LLM at the same time, the LLM may output relevant information to the second user as soon as it is received by the first user.

Figure 4:
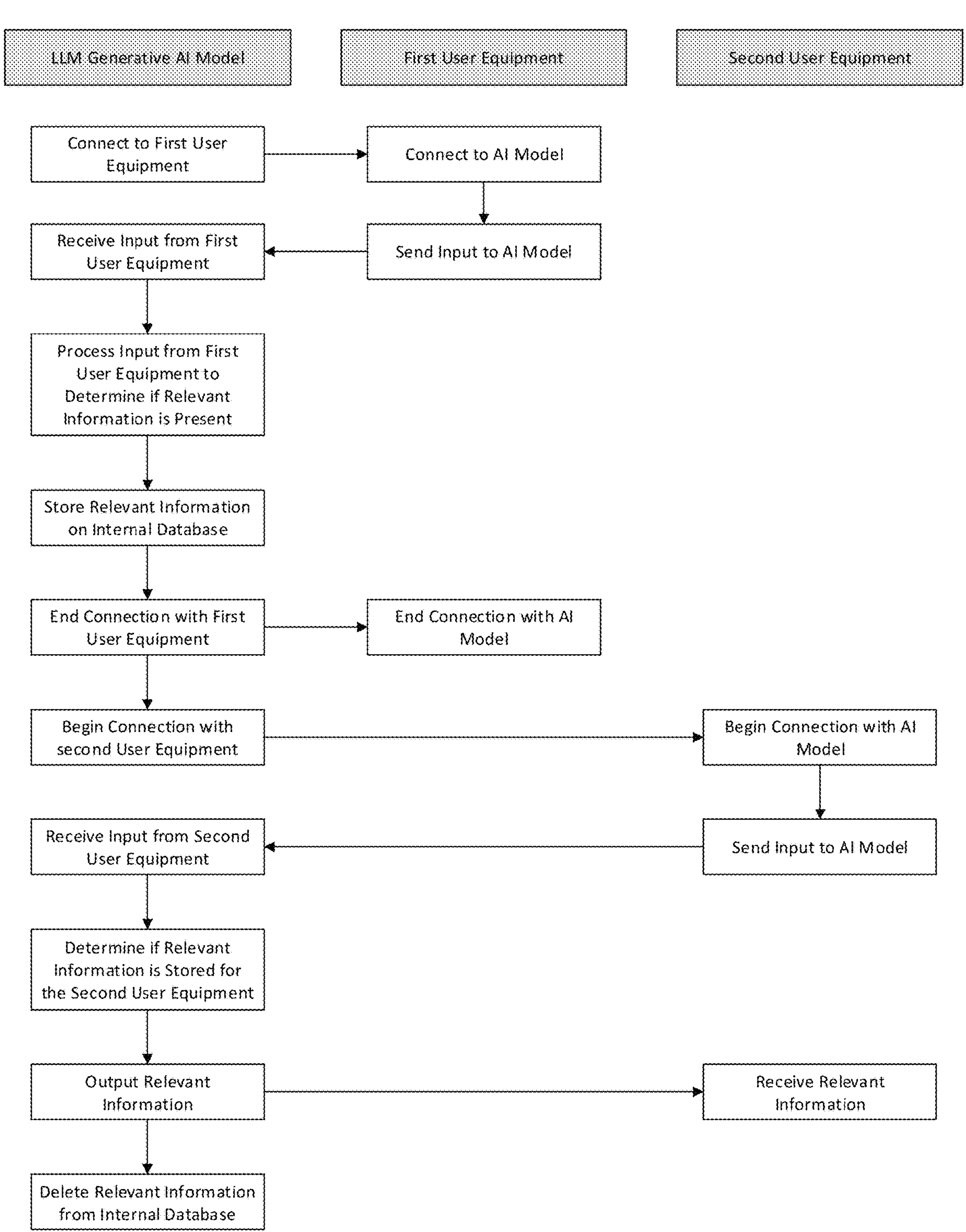
FIG. 4 is a flowchart illustrating communications events between a first user equipment, a second user equipment, and the modified generic generative AI LLM system of FIG. 1.

FIG. 4 similarly illustrates a series of communications events between the LLM, a first user equipment, and a second user equipment. As shown, at a first stage, the LLM and the first user equipment connect and establish a method of communication. An input is sent from the first user equipment to the LLM, which processes the input to determine whether relevant information is present. If relevant information is present, the information is stored on the internal database for reference or for later use. The connection between the first user equipment and the AI model may end, and a connection with the second user equipment and the LLM may begin. Alternately, the connections between the first user equipment and the LLM and the second user equipment and the LLM may be concurrent. The second user equipment may provide an input to the LLM, which may be in the form of identifying information or a passkey. Based on the identity of the second user equipment, the LLM may determine that the relevant information stored is relevant to the second user equipment. If the relevant information is for the second user equipment, the LLM may then output that relevant information to the second user equipment.

The LLM may filter the outputs to the second user equipment based on the type of user equipment, for security reasons, or for ease of understanding. For example, more information may be output if the second user equipment is a computer with a large screen, compared to a mobile device where it may be difficult to read a large block of text. Alternately or in addition, the responses may be filtered if the second user equipment is a device with fewer security measures, compared to a device with more security measures. In an embodiment, the relevant information may be deleted from the internal database after being output to the second user equipment, or may remain on the internal database. In a further embodiment, the determination of whether the relevant information is deleted or stored may be based on predefined retention policies. For example, updates to legal data, financial data, employment data, etc. may be required to be kept for a certain period of time before being deleted. These retention policies may be dynamically updated based on regulatory updates, or policy updates. Although a first and second user equipment are illustrated in FIG. 4, a person of skill in the art understands that a similar process may occur between an LLM and any number of user equipment. Alternately or in addition, more than one LLM may be present in the process, and may interact with other LLMs and/or any user equipment.

Figure 5:
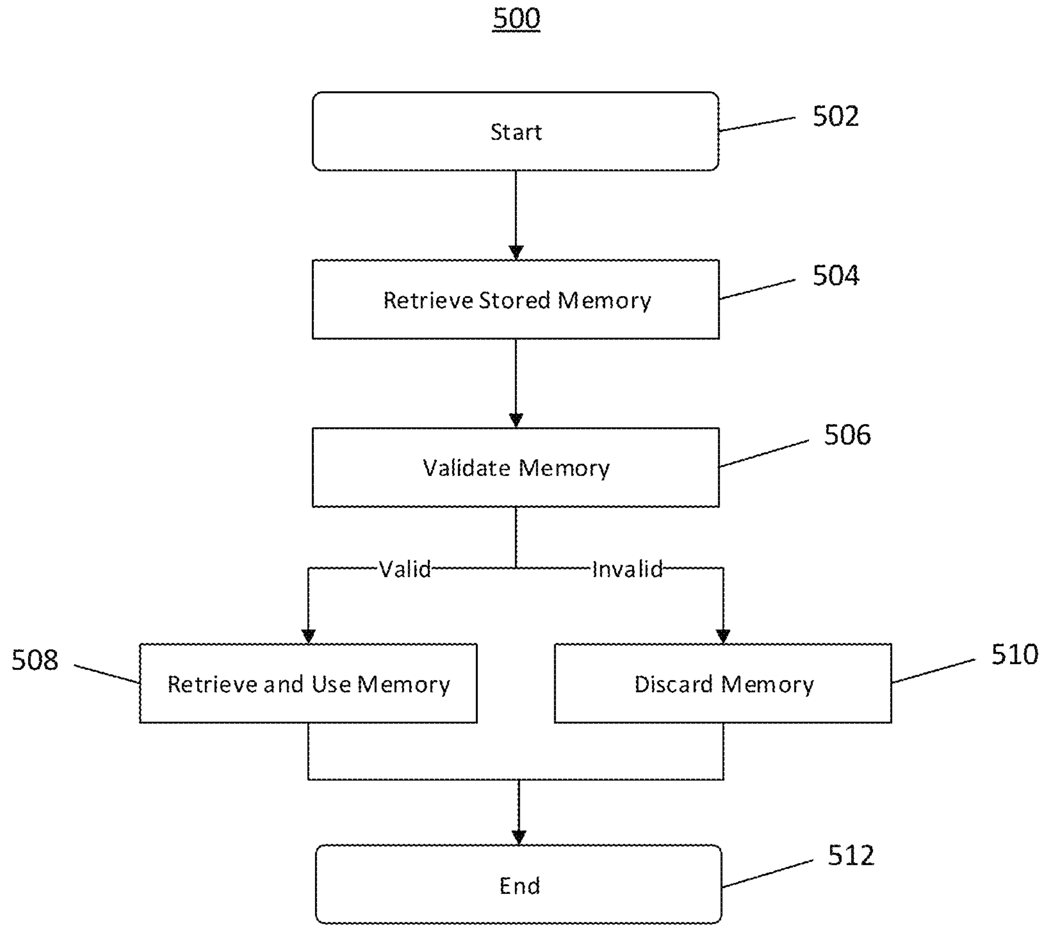
FIG. 5 is a flowchart illustrating how the AI LLM system of FIG. 1 retrieves and validates stored memory before recall.

FIG. 5 illustrates an example flowchart for validating stored memory before retrieval. At step 502, the retrieval process begins, which may be prompted by a determination that the stored memory is relevant to the current user that is interacting with the LLM. At step 504, the LLM retrieves the stored memory from the database 102, based on interactions with the current user. At step 506, the LLM checks the validity of the recalled information, by comparing it to real-time external knowledge sources or updated user inputs. The updated user inputs may come from the current user, or may come from the user who original stored the memory on the database, as inputs or guidelines may have changed since the memory was originally stored. If the memory is checked and determined to be valid, the LLM may retrieve the memory at step 508 and use the memory to output a response to the current user. Alternately, if the memory is determined to be invalid, the LLM may discard the memory at step 510, or may alternately modify the memory to match the current information, or flag the memory to be reviewed manually. In an embodiment, the LLM may determine the probability that the information is outdated based on the context of the information, and adjust the memory weighting accordingly. At step 512, the process ends, either with an output to the current user if the memory is determined to be valid, and without an output if the memory is determined to be invalid. In an embodiment, if the memory is determined to be invalid but may be automatically modified to match the current information, the LLM may revalidate the memory and use the memory if subsequently determined to be valid.

FIG. 6 illustrates an exemplary structure for assigning access control levels to different users that interact with the LLM, the access control levels or access permissions being dynamically adjusted based on user trust, authentication credentials, and real-time system updates. When a user requests information from the LLM, or when the LLM determines that information may be relevant to the current user, the LLM may determine the access level of the user based on the user role, stored authentication credentials and past interactions before outputting the information to the user or granting access (FIG. 7). In an embodiment, the LLM may weigh the user role, authentication credentials, and past interactions against each other when assigning a user access level, or determining whether to output information. When relevant information is first stored on the database 102 by a first user, the user may specify that the relevant information is restricted to a certain access level. Alternately or in addition, the LLM may automatically determine that certain information should be restricted to a certain access level based on the content of the information. For example, the LLM may determine that information about a user's first and last name may be saved as public information that can be accessed by any access level, but financial information relating to a user should be stored as restricted information that can only be accessed by the highest access level. Further, users of higher access levels may be able to access detailed and personalized information, while users with lower access levels can only receive limited responses, or may be denied access. The access levels or permissions for a user may be dynamically modified based on security policies and user behavior, as is described more in depth below. In an embodiment, access levels and settings related to the outputs of the LLM may be adjusted through a user customization interface. If a lower access user attempts to access unauthorized information, or if there is an unauthorized access attempt, the LLM may include an escalation protocol that may flag the attempt in real time and escalate to a user with higher access permissions. The above features of the LLM serve to prevent unauthorized access to information or memory recall from users who should not have access, by evaluating user profiles, security levels, and past interactions.

In an example, the LLM determines that updated financial information about an alternate user may be relevant to the current user. Before outputting the information, the LLM may determine that the user is a partial access user 608. Upon this determination, the LLM may further determine at the access control layer 604 that the user is entitled to only general update information regarding the alternate user. The LLM may then retrieve some information from the memory storage 602, but not all information. In the case of discrepancies in stored memory among different access levels, the LLM may comprise an internal conflict resolution mechanism that may address the discrepancies. Although FIG. 6 depicts three levels of users (full access users 606, partial access users 608, and limited access users 610), it will be appreciated that this type of structure may have any number of users, and any number of access levels. Further the structure may have more than one access control layer, and may have further barriers to information based on a user's access level.

FIG. 7 illustrates a system whereby the LLM may dynamically adjust memory retrieval based on a user trust scores, the user trust scores based on past interactions, detected anomalies, and external validation sources. With each interaction, as a user interacts with the LLM, a trust score calculation layer 704 dynamically adjusts a trust score for each user before and during memory retrieval from the memory storage 702. In an embodiment, the trust levels may be adjusted in response to verified or conflicting inputs: the trust level may increase as a result of verified inputs, and may be reduced as a result of conflicting inputs. For example, a user 708 may have a medium trust score, but may be dynamically reduced to a low trust score due to inconsistencies in the user interactions or misuse of the LLM. Similarly, a user's trust score may be dynamically increased based on proper use of the LLM and consistent interactions. If a user's trust score drops below a threshold, the LLM will automatically reduce the memory recall permissions associated with the user. The threshold value may be prespecified, or may be dynamically changed based on updated policies, regulation, or user interaction. In order to refine the trust scores and analyze user inputs, the LLM may employ a sentiment analysis to user inputs and LLM outputs. Any inconsistencies or access anomalies may be flagged in real time for review as a potential security breach. In an embodiment, the LLM may cross-reference stored memory with external validation sources before retrieving the memory or outputting the memory or information to the user. As illustrated in FIG. 6, users with high trust scores may receive detailed information, and/or may receive priority recall of past interactions and updated information, whereas users with low trust scores may receive limited or filtered access. In an embodiment, a user's trust score may be further updated in real-time in response to organizational policy chances, or with reference to user-specific security parameters. To maintain confidence, the LLM may provide users with transparency reports, which may detail how the trust scores and permissions are determined.

The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprises of a sub-combination of features which may not be explicitly described above. In addition, features from one or more of the above-described embodiments may be selected and combined to create alternative embodiments comprised of a combination of features which may not be explicitly described above. Features from one or more embodiments may be combined, rearranged, or omitted without departing from the scope of the invention, as defined by the claims. Features suitable for such combinations and sub-combinations would be readily apparent to persons skilled in the art upon review of the present disclosure as a whole. The subject matter described herein intends to cover all suitable changes in technology. The subject matter described herein is intended to cover all variations, modifications, and equivalents that fall within the spirit and scope of the invention.

Certain adaptations and modifications of the described embodiments can be made. Therefore, the above discussed embodiments are considered to be illustrative and not restrictive.

What is claimed is:

1. A system for artificial intelligence (AI) memory recall, comprising:

a memory storage module configured to persist context beyond a single interaction, wherein the memory storage module comprises stored contextual data;

a generative artificial intelligence (GenAI) model with integrated memory recall;

a server operatively coupled to the memory storage module and the GenAI model, wherein the server is configured to:

recall, from the memory storage module, contextual data associated with a user profile across a plurality of prior interactions, wherein the contextual data is retrievable for provision to the GenAI model;

authorize, using a hierarchical access control mechanism, a user access to the contextual data, wherein:

the hierarchical access control mechanism restricts the user access based on user authorization levels; and the recall is dynamically adjusted based on the user authorization levels, preventing unauthorized retrieval;

validate, using a memory validation module, the contextual data, based on whether the contextual data satisfies accuracy or consistency requirements, wherein:

the memory validation module performs real-time cross-referencing of the contextual data against external knowledge sources; and the server prevents output of unvalidated contextual data by discarding or flagging the contextual data that fails the memory validation module;

filter, using an adaptive recall filtering mechanism, the contextual data according to a dynamically assigned user trust score, wherein the user trust score is refined based on a sentiment analysis of user interactions, and wherein the sentiment analysis performed by the GenAI model; and output, the contextual data to the GenAI model for generating one or more personalized responses, the output only occurring if the contextual data is validated and the user access to the contextual data is authorized.

2. The system of claim 1, wherein the memory storage module is configured to allow selective deletion of the stored contextual data based on predefined retention policies.

3. The system of claim 1, wherein the server assigns contextual tags to the stored contextual data, the contextual tags enabling-expedited retrieval.

4. The system of claim 1, wherein the GenAI model determines a probability of outdated information and adjusts a memory weighting accordingly before the recall.

5. The system of claim 1, wherein the user authorization levels are dynamically assigned and updated based on authentication credentials and interaction history.

6. The system of claim 1, wherein the user authorization levels are modified in real-time based on organizational policy changes or user-specific security parameters.

7. The system of claim 1, wherein the memory validation module includes a self-verification module that identifies inconsistencies in the stored contextual data before the recall.

8. The system of claim 1, wherein the GenAI model reduces access to the contextual data if the user trust score falls below a predefined threshold.

9. The system of claim 1, wherein the server is further configured to track, using an auditing mechanism, memory recall history.

10. The system of claim 9, wherein the GenAI model generates an audit log for the memory recall history to ensure compliance with data protection regulations.

11. The system of claim 1, wherein the server recalls the contextual data when a user switches between devices.

12. The system of claim 1, wherein the GenAI model filters the one or more personalized responses based on a device type of the electronic device.

13. The system of claim 1, further comprising a user customization interface that allows manual adjustments to memory recall settings.

14. The system of claim 1, wherein the server is further configured to resolve, using a conflict resolution mechanism, discrepancies in the AI memory among different access levels, wherein the conflict resolution mechanism includes an escalation protocol upon an unauthorized access attempt.

15. The system of claim 1, wherein the GenAI model ranks the contextual data based on user-defined importance levels.

16. The method of claim 1, wherein the GenAI model generates proactive memory suggestions based on detected patterns of one or more user inputs.

17. The system of claim 1, wherein the server provides users with a transparency reports on how the memory recall is determined.

18. The system of claim 1, wherein the hierarchical access control mechanism identifies access anomalies and flags potential security breaches in real-time.

19. The system of claim 1, wherein the memory storage module stores multiple user profiles, interaction history, and contextual tags associated with prior communication sessions.

20. A method for AI memory recall, comprising:

recalling, from a memory storage module, contextual data associated with a user profile across a plurality of prior interactions, wherein:

the contextual data is retrievable for provision to a GenAI model with integrated memory recall; and the memory storage module is configured to persist context beyond a single interaction;

authorizing, using a hierarchical access control mechanism, a user access to the contextual data, wherein:

the hierarchical access control mechanism restricts the user access based on user authorization levels; and the recalling is dynamically adjusted based on the user authorization levels, preventing unauthorized retrieval;

validating, using a memory validation module, the contextual data, based on whether the contextual data satisfies accuracy or consistency requirements, wherein:

the memory validation module performs real-time cross-referencing of the contextual data against external knowledge sources; and the server prevents output of unvalidated contextual data by discarding or flagging the contextual data that fails the memory validation module;

filtering, using an adaptive recall filtering mechanism, the contextual data according to a dynamically assigned user trust score, wherein the user trust score is refined based on a sentiment analysis of user interactions, and wherein the sentiment analysis is performed by the GenAI model; and outputting the contextual data to the GenAI model for generating one or more personalized responses, the outputting occurring only if the contextual data is validated and the user access to the contextual data is authorized.

* * * * *